(12) United States Patent
Welter et al.

(10) Patent No.: US 9,663,014 B1
(45) Date of Patent: May 30, 2017

(54) REMOVABLE RUNNING BOARD AND LOADING RAMP WITH ROTATING WIDTH ADJUSTMENT

(71) Applicant: AISIN TECHNICAL CENTER OF AMERICA, INC., Northville, MI (US)

(72) Inventors: Aaron Welter, Northville, MI (US); Eric Archambeau, South Lyon, MI (US); Bradley Baskin, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/010,429

(22) Filed: Jan. 29, 2016

(51) Int. Cl.
*B65G 69/30* (2006.01)
*B60P 1/43* (2006.01)
*B60R 3/00* (2006.01)

(52) U.S. Cl.
CPC .............. *B60P 1/435* (2013.01); *B60R 3/002* (2013.01); *B65G 69/30* (2013.01)

(58) Field of Classification Search
CPC .......... B60P 1/435; B60P 1/433; B60R 3/002; B60R 3/007; B65G 69/30; A61G 3/061
USPC .......... 280/164.1; 14/69.5; 414/537
See application file for complete search history.

(56) References Cited

U.S. PATENT DOCUMENTS

| | | | | |
|---|---|---|---|---|
| 1,310,973 A * | 7/1919 | Von Schrenk | .......... | B60R 3/002 224/42.32 |
| 1,453,362 A * | 5/1923 | Loveland | ................ | B60R 11/06 224/538 |
| 3,069,709 A * | 12/1962 | Law | ....................... | B65G 69/30 14/69.5 |
| 3,517,791 A * | 6/1970 | Miles | ........................ | B60P 1/43 14/69.5 |
| 4,021,055 A * | 5/1977 | Okland | ................... | B60R 3/002 280/163 |
| D246,449 S * | 11/1977 | Poe | ............................. | D12/133 |
| 4,248,004 A * | 2/1981 | Trotter | ................... | A01K 97/06 43/54.1 |
| 4,557,494 A * | 12/1985 | Elwell | ..................... | B60Q 1/323 24/514 |
| 4,909,700 A * | 3/1990 | Fontecchio | .............. | A61G 3/06 254/10 R |
| 6,082,751 A * | 7/2000 | Hanes | ....................... | B60R 3/02 280/163 |
| 6,135,472 A * | 10/2000 | Wilson | ...................... | B60R 3/02 280/164.1 |
| 6,267,484 B1 * | 7/2001 | Baker | .................... | A01K 97/06 362/154 |

(Continued)

*Primary Examiner* — J. Allen Shriver, II
*Assistant Examiner* — Brian Cassidy
(74) *Attorney, Agent, or Firm* — Oblon, McClelland, Maier & Neustadt, L.L.P.

(57) ABSTRACT

A platform apparatus for a vehicle including a first structure including a first surface and a first interlocking joint; a second structure including a second surface and a second interlocking joint to receive the first interlocking joint; and a linkage that connects the first structure and the second structure and articulates the apparatus from a closed position to an open position. In the closed position the first surface and the second surface are vertically stacked and in the open position the first structure and the second structure are interlocked through the first interlocking joint and the second interlocking joint and the first surface and the second surface are horizontally adjacent.

13 Claims, 3 Drawing Sheets

(56) References Cited

U.S. PATENT DOCUMENTS

| | | | | |
|---|---|---|---|---|
| 6,270,099 B1 * | 8/2001 | Farkash | | B60R 3/002 182/127 |
| 6,293,748 B1 * | 9/2001 | Savaria | | B60P 1/43 14/69.5 |
| 6,389,629 B1 * | 5/2002 | Schouest | | B60P 1/43 119/849 |
| 6,520,523 B2 * | 2/2003 | Beck | | B60R 3/007 108/44 |
| 6,592,135 B2 * | 7/2003 | Hendrix | | B60R 3/002 14/71.1 |
| 7,004,486 B1 * | 2/2006 | Farkash | | B60R 3/002 280/164.1 |
| 7,043,789 B2 * | 5/2006 | Morrish | | A61G 3/061 14/69.5 |
| 7,179,042 B1 * | 2/2007 | Hartmann | | B65G 69/30 14/69.5 |
| 7,350,843 B2 * | 4/2008 | Meyers | | B60P 1/43 14/69.5 |
| 7,488,025 B1 * | 2/2009 | Roberson | | B60P 1/433 296/61 |
| 7,637,518 B2 | 12/2009 | Adair | | |
| 7,708,294 B2 | 5/2010 | Demick | | |
| 7,717,445 B2 | 5/2010 | Peterson et al. | | |
| 8,556,283 B2 * | 10/2013 | Coochesfahani | | B60R 3/02 105/447 |
| 8,857,880 B2 * | 10/2014 | Kalergis | | B60P 1/43 224/403 |
| 8,864,158 B1 * | 10/2014 | Perkins | | B60R 3/002 280/163 |
| 9,278,650 B2 * | 3/2016 | Meszaros | | B60R 9/02 |
| 2005/0281654 A1 * | 12/2005 | Ehler | | B60P 3/12 414/537 |
| 2007/0246965 A1 * | 10/2007 | Adair | | B60P 1/43 296/61 |
| 2007/0261181 A1 * | 11/2007 | Willard | | B60P 1/435 14/71.1 |
| 2009/0044729 A1 | 2/2009 | Navarre et al. | | |
| 2015/0175079 A1 * | 6/2015 | Kmita | | B60R 3/007 280/166 |
| 2016/0185273 A1 * | 6/2016 | Aftanas | | B65G 69/30 280/164.1 |

* cited by examiner

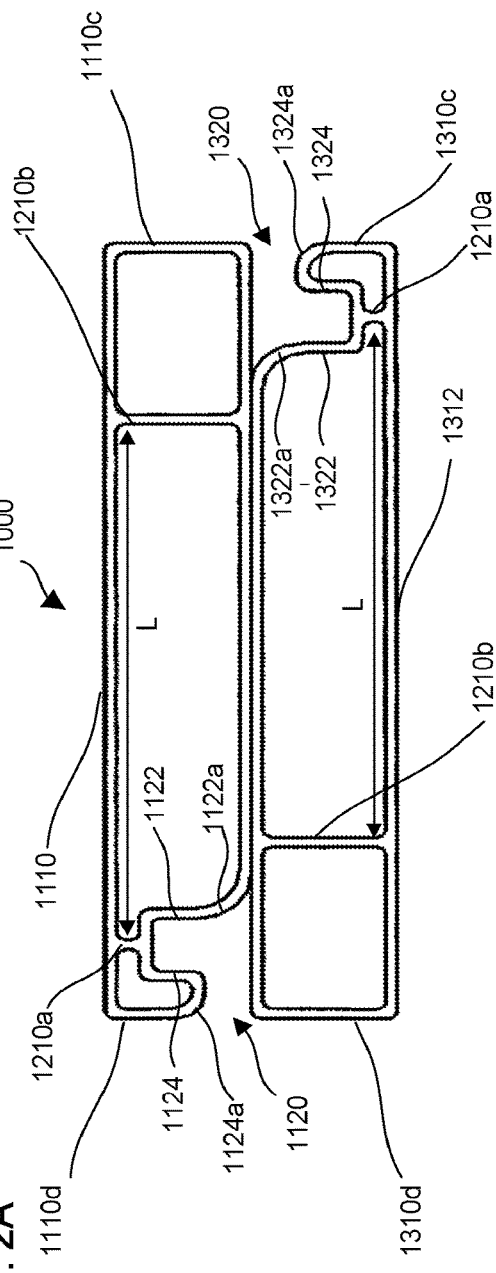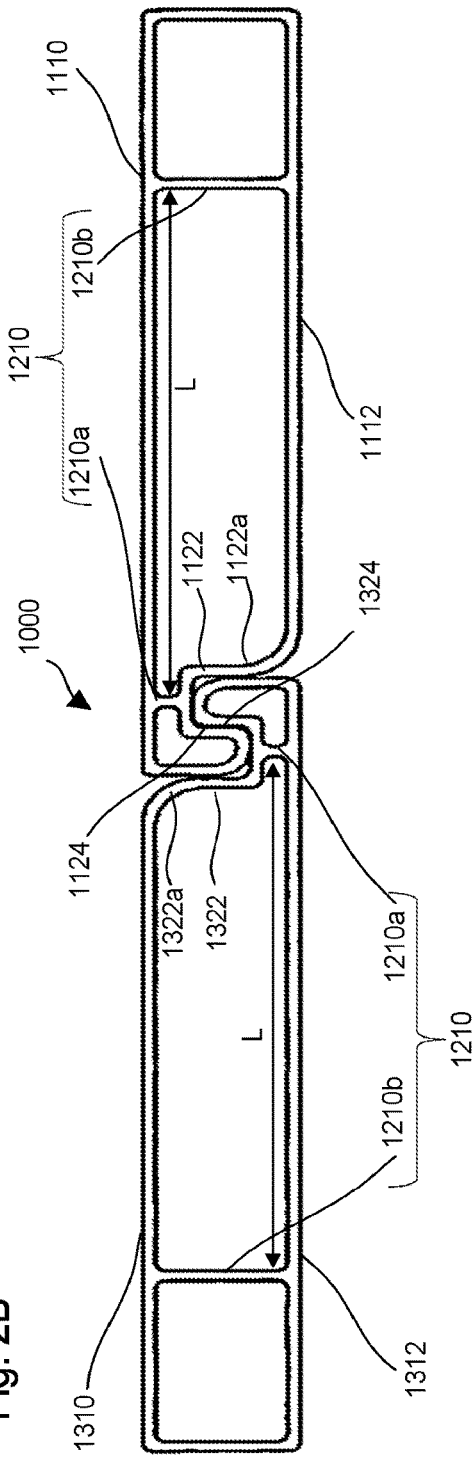

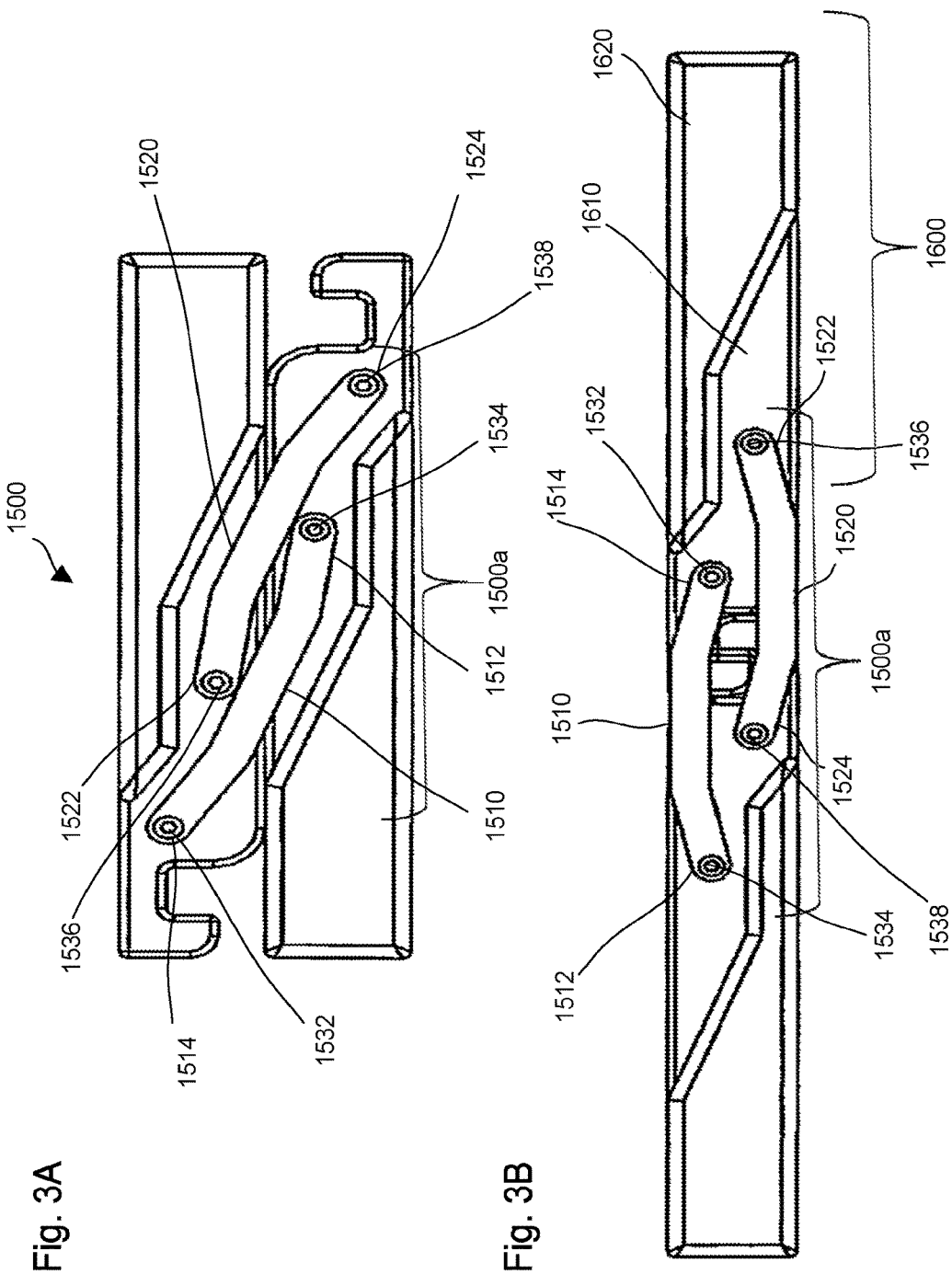

REMOVABLE RUNNING BOARD AND LOADING RAMP WITH ROTATING WIDTH ADJUSTMENT

BACKGROUND

Field of the Disclosure

The present disclosure relates to a platform apparatus for a vehicle that can be used as a running board and a loading ramp.

Description of the Related Art

Utility and recreational vehicles such as light duty trucks or sport utility vehicles (SUVs) are often employed to transport heavy cargos such as tools, materials or small vehicles such as tractors or all-terrain vehicles (ATVs). Such a transport often requires a user to load and unload these heavy cargos to and from a higher cargo area of the vehicle. To facilitate the loading and unloading of the heavy cargos a loading ramp forming an inclined surface between the ground surface and the cargo area is often used.

Furthermore, these utility and recreational vehicles are often provided with high door entrances requiring the use of support or stepping surfaces such as running boards placed beneath the entrance doors. A platform apparatus combining the function of a loading ramp and a running board is then desired.

Several platform apparatus with the ability to be used as a loading ramp and a running board have been disclosed.

For example, in the U.S. Pat. No. 7,717,445 B2, a detachable side step assembly including two elongated section hinges is described. The hinges render the detachable side step component structurally weak. Furthermore, the detachable side step requires a special attachment bracket to connect to the vehicle. The detachable side step in U.S. Pat. No. 7,717,445 B2 is difficult to fit onto and remove from the brackets. In addition, a modification of the tailgate of the vehicle is required when the side step assembly is used as a loading ramp.

In another example, in the pre-grant publication US2009/0044729A1, a multifunctional running board that can also be used as a loading ramp is described. The running board includes a single platform, which can be dismounted and mounted to a vehicle using a pin, bolt, or knob, and a storage compartment that can house a ramp or other items. The width of the platform cannot be adjusted when used as a loading ramp which limits the practicability of the platform. In other words, this platform might be not appropriate for extremely large cargo.

In the U.S. Pat. No. 7,637,518 B2, a utility ramp and a running board system are disclosed. The utility ramp has two folding portions at the ends. Each folding portion has an internal mechanism including a spring and two links so that it grips a bracket to attach to the side of the vehicle. The folding portions also provide an entry and exit transition for the ramp on the ground and at the tailgate. The utility ramp in U.S. Pat. No. 7,637,518 B2 does not have adjustable width. It is always narrow, which is not good for loading medium and large equipment.

In the U.S. Pat. No. 7,708,294 B2, a detachable dual use platform apparatus that can be locked and unlocked to a vehicle with a key is disclosed. However, the platform in U.S. Pat. No. 7,708,294 B2 does not provide an adjustable width.

SUMMARY

Accordingly, the object of the present disclosure is to provide a platform apparatus which overcomes the above-mentioned limitations.

More precisely, this platform apparatus relies on two similar parts that can be articulated from a closed position to an open position. In the closed position, the two parts are stacked on top of each other to form a narrow structure that may be used as a running board, while in the open position the two parts are locked side by side to form a wide structure that may be used as a loading ramp.

In addition, this platform apparatus disclosed a plurality of holes providing the ability to secure the platform apparatus in the open position without any modification of the vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A is a sectional view of the platform apparatus in the closed position, according to certain aspects of the disclosure;

FIG. 2B is a sectional view of the platform apparatus in the open position, according to certain aspects of the disclosure;

FIG. 3A is a side view of the platform apparatus in the closed position, according to certain aspects of the disclosure; and FIG. 3B is a side view of the platform apparatus in the open position, according to certain aspects of the disclosure.

DETAILED DESCRIPTION

Figure 1A:
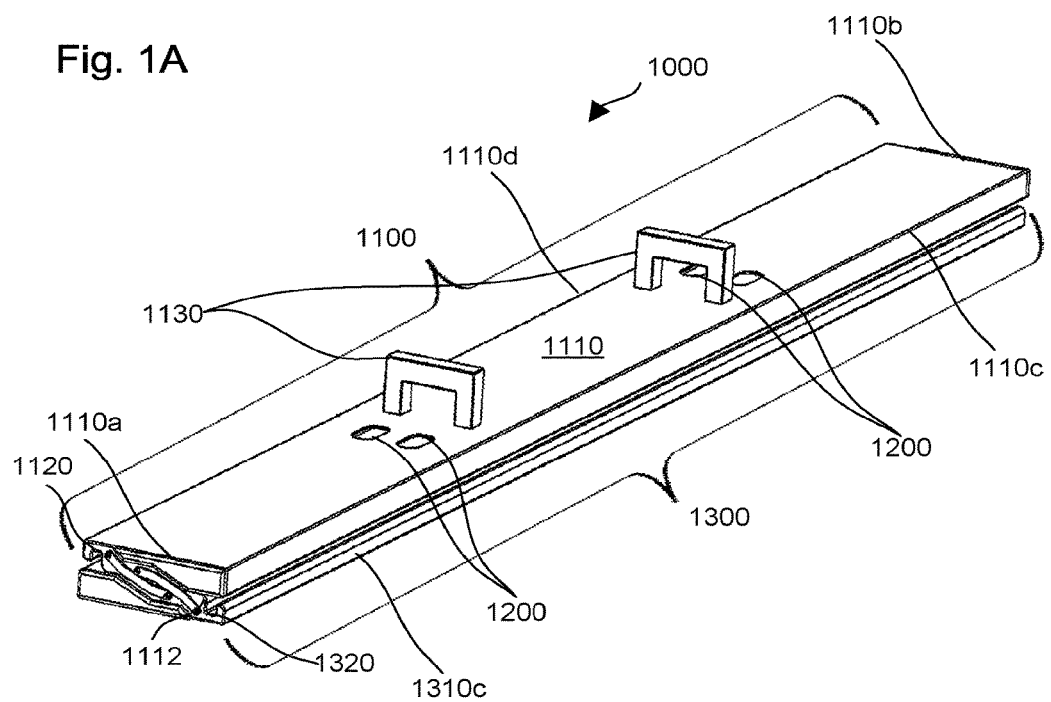
FIG. 1A is a perspective view of a platform apparatus in a closed position, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
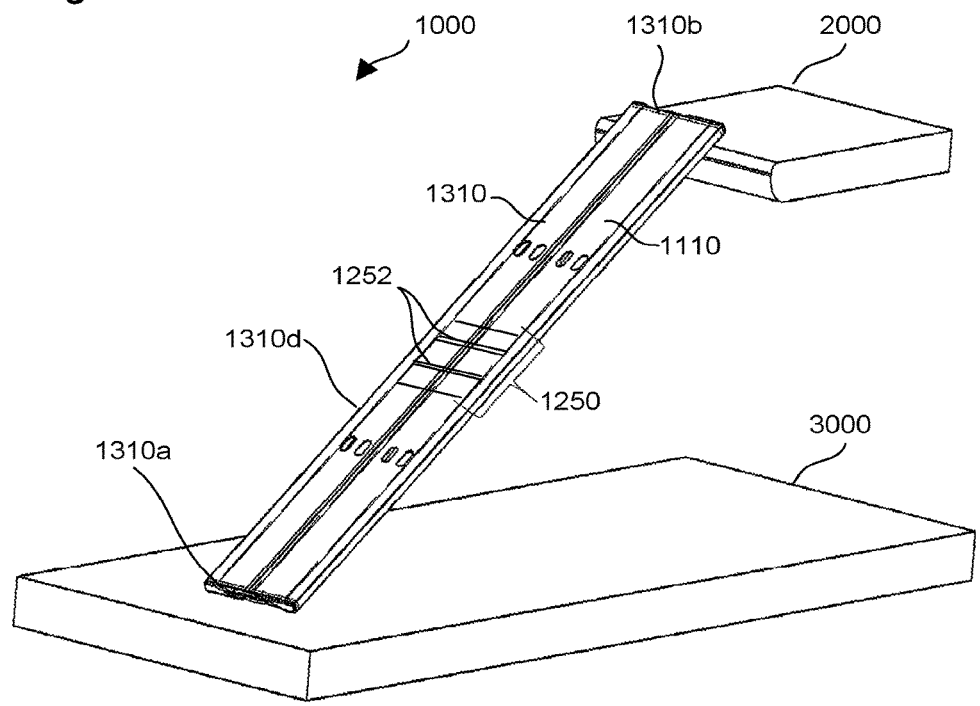
FIG. 1B is a perspective view of the platform apparatus in an open position, according to certain aspects of the disclosure.

FIGS. 1A-1B are perspective views of a platform apparatus 1000 in a closed position and in an open position, respectively and according to certain aspects of the disclosure. FIGS. 2A-2B are sectional views of the platform apparatus 1000 in the closed position and in the open position, respectively and according to certain aspects of the disclosure.

The platform apparatus 1000 includes a first structure 1100 and a second structure 1300 linked together via a linkage 1500, see FIGS. 3A-3B. The linkage 1500 enables to articulate the platform apparatus 1000 from the closed position to the open position and vice versa.

In the closed position, the first structure 1100 is stacked on top of the second structure 1300 in order for the platform apparatus 1000 to form a narrow structure that may be used as a running board, e.g. a narrow step fitted under a side door of a vehicle. Accordingly, a first contact surface 1110 and a second contact surface 1310 are vertically stacked.

In the open position, the first structure 1100 and the second structure 1300 are placed side by side in order for the platform apparatus 1000. Accordingly, the first contact surface 1110 and the second contact surface 1310 are interlocked through a first interlocking joint 1120 and a second interlocking joint 1320, see FIGS. 2A-2B, and the first contact surface 1110 and the second contact surface 1310 are horizontally adjacent to form a wide structure that may be used as a loading ramp to facilitate the loading of a load, e.g. a small all-terrain vehicle, from a lower support structure 3000 to an upper support structure 2000. For example, the upper support structure 2000 may be a tailgate or a bed of a truck and the lower support structure 3000 may be a ground surface.

The first structure 1100 may have a rectangular shape with a first front side 1110a opposite to a first rear side 1110b and a first right side 1110c opposite to a first left side 1110d. The first front side 1110a, the first rear side 1110b, the first right side 1110c, and the first left side 1110d are positioned between the first contact surface 1110 facing upwards and a first non-contact surface 1112 facing downwards.

Near to the first left side 1110d and from the first front side 1110a to the first rear side 1110b, the first non-contact surface 1112 forms the first interlocking joint 1120 that may have a similar shape and/or function as a tabled splice joint. The first interlocking joint 1120 may include a first internal cheek 1122 and a first external cheek 1124.

The second structure 1300 may be substantially identical to the first structure 1100. Accordingly, the second structure 1300 may have a rectangular shape with a second front side 1310a opposite to a second rear side 1310b and a second right side 1310c opposite to a second left side 1310d. The second front side 1310a, the second rear side 1310b, the second right side 1310c and the second left side 1310d are positioned between the second contact surface 1310 facing upward and a second non-contact surface 1312 facing downward.

Near to the second left side 1310d and running from the second front side 1310a to the second rear side 1310b, the second contact surface 1310 forms the second interlocking joint 1320 similar to the first interlocking joint 1120. The second interlocking joint 1320 may include a second internal cheek 1322 and a second external cheek 1324.

As shown in FIG. 2A, when the platform apparatus 1000 is placed in the closed position, the first non-contact surface 1112 of the first structure 1100 lays on the second contact surface 1310 of the second structure 1300.

As shown in FIG. 2B, when the platform apparatus 1000 is place in open position, the first contact surface 1110 is substantially aligned with the second contact surface 1310 and the first interlocking joint 1120 is inserted into the second interlocking joint 1320.

When the first interlocking joint 1120 and the second interlocking joint 1320 are inserted between each other, the first structure 1100 and the second structure 1300 cannot be pulled from each other in a direction parallel to the first contact surface 1110 and the second contact surface 1310. In other words, the first structure 1100 and the second structure 1300 are interlocked. The interlocking between the first structure 1100 and the second structure 1300 is due to the lateral connections between the first internal cheek 1122 and the second right side 1310c; the second external cheek 1324 and the first external cheek 1124; and the first left side 1110d and the second internal cheek 1322.

In addition, the first internal cheek 1122 and the first non-contact surface 1112 may be connected by a first internal rounded corner 1122a while the first external cheek 1124 and the first left side 1110d may be connected by a first external rounded corner 1124a. Similarly for the second structure 1300, the second internal cheek 1322 and the second contact surface 1310 may be connected by a second internal rounded corner 1322a while the second external cheek 1324 and the second right side 1310c may be connected by a second external rounded corner 1324a.

The first internal rounded corner 1122a, the first external rounded corner 1124a, the second internal rounded corner 1322a, and the second external rounded corner 1324a facilitate the insertion of the first interlocking joint 1120 into the second interlocking joint 1320 as well as the withdrawal of the first interlocking joint 1120 from the second interlocking joint 1320.

The first structure 1100 and the second structure 1300 may have a hollow structure with internal walls 1210 to increase the stiffness of the platform apparatus 1000. The internal walls 1210 may include small ribs 1210a and big ribs 1210b. The small ribs 1210a may be arranged at a concave portion of the first interlocking joint 1120 and of the second interlocking joint 1320 while the big ribs 1210b may be arranged in the first structure 1100 and the second structure 1300.

The small ribs 1210a may support parts of the first interlocking joint 1120 and the second interlocking joint 1320 that could be weak and/or subject to severe stresses and strains when the platform apparatus 1000 is in the open or closed position. The small ribs 1210a may be arranged in thin parts of the first interlocking joint 1120 and the second interlocking joint 1320, e.g., between the first internal cheek 1122 and the first external cheek 1124 and between the second internal cheek 1322 and the second external cheek 1324.

The big ribs 1210b may be positioned at a predetermined distance L from the small ribs 1210a to evenly distribute a load on the first structure 1100 and on the second structure 1300, when the platform apparatus 1000 is in the open position.

The first structure 1100 and the second structure 1300 may be made from sturdy materials such as metallic alloys or plastics and be produced through extrusion techniques.

Due to the similarity between the first structure 1100 and the second structure 1300, the first structure 1100 and the second structure 1300 may be made from a one single extruded piece.

The first contact surface 1110 and/or the second contact surface 1310 may include a plurality of holes 1200. The plurality of holes 1200 may be used to mount the platform apparatus 1000 in the closed position under the side door of the vehicle. For example, brackets protruding from a side of the vehicle may have tightening mechanisms that can be inserted into at least one hole of the plurality of holes 1200 to sturdily affix the platform apparatus 1000 to the vehicle. The tightening mechanisms may be protrusions mounted on an end of the brackets that can be fastened to at least one hole of the plurality of holes 1200. For example, the tightening mechanisms may be threaded rods that can be inserted and fastened, e.g., via a nut, to at least one hole of the plurality of holes 1200.

In addition, the plurality of holes 1200 may be used to secure the platform apparatus 1000 in the open position to the upper support structure 2000 and/or the lower support structure 3000. For example, straps affixed to the upper support structure 2000 and/or lower support structure 3000 may be inserted in the plurality of holes 1200 to securely tie the platform apparatus 1000. Securing the platform apparatus 1000 via straps does not require any modification of the upper support structure 2000. For example, when the upper support structure 2000 is a tailgate or a bed of a truck, the straps can be tied to any element of the truck, e.g. a hook, a hinge or a toolbox.

Alternatively, the first contact surface 1110 of the first structure 1100 may include a pair of handles 1130 to carry and articulate the apparatus 1000. The pair of handles 1130 may be any kind of handle that do not substantially protrude from the first contact surface 1110 when not in use. For example, the pair of handles 1130 may be a pair of retractile handle capable of laying on the first contact surface 1110 when not in use and capable of being pull up from the first contact surface 1110 when in use. Alternatively, the pair of handles 1130 may be a pair of removable handles that can be anchored to the platform apparatus 1000 through a grip, e.g. a hole or a hook.

Alternatively, the first contact surface 1110 and/or the second contact surface 1310 may include a plurality of slip resistant elements 1250 in order to increase the friction coefficient between the first contact surface 1110 and/or the second contact surface 1310 and the load to be loaded from the lower support structure 3000 to the upper support structure 2000. For example, the plurality of slip resistant elements 1250 may be textured surface sections of the first contact surface 1110 and/or the second contact surface 1310 forming transversal ridges 1252 or may be textured surface sections coated with anti-slippery materials, such as rubbers.

FIGS. 3A-3B are side views of the platform apparatus 1000 in the closed position and in the open position, respectively.

The linkage 1500 enables the user to articulate the apparatus 1000 from the closed position to the open position, and vice versa, in one smooth step, e.g., by pivoting the first structure 1100 on top of the second structure 1300.

The linkage 1500 includes a front linkage 1500a linking the first front side 1110a with the second front side 1310a. The front linkage 1500a includes a first arm 1510 with a C-shape and a second arm 1520 with a C-shape. Needless to say, for example, the shape of the linkage 1500a may be modified in a linear shape.

The first arm 1510 has a first extremity 1512 affixed to the second front side 1310a substantially near the first contact surface 1110 via a first pivot 1532 and a second extremity 1514 affixed to the first front side 1110a substantially near the second contact surface 1310 via a second pivot 1534.

The second arm 1520 has a first extremity 1522 affixed to the first front side 1110a substantially near the first non-contact surface 1112 via a third pivot 1536 and a second extremity 1524 affixed to the second front side 1310a substantially near the second surface non-contact surface 1312 via a fourth pivot 1538.

The first pivot 1532, the second pivot 1534, the third pivot 1536, and the fourth pivot 1538 enable the first structure 1100 and the second structure 1300 to rotate around each other.

The first pivot 1532, the second pivot 1534, the third pivot 1536, and the fourth pivot 1538 may be any kind of fastening device capable that lets the first arm 1510 and the second arm 1520 rotating around the first structure 1100 and the second structure 1300. For example, the first pivot 1532, the second pivot 1534, the third pivot 1536, and the fourth pivot 1538 may be rivets or shoulder screws, or any other devices known by someone having ordinary skills in the art.

When the apparatus 1000 is in the closed position, the first arm 1510 is below the second arm 1520 with the first arm 1510 and the second arm 1520 are facing each other in a staggered way. The first extremity 1522 of the second arm 1520 contacts the first arm 1510 while the first extremity 1512 of the first arm 1510 contacts the second arm 1520.

When the apparatus 1000 is in the open position, the first arm 1510 is on top of the second arm 1520 without any contact between the first arm 1510 and the second arm 1520.

In addition, the linkage 1500 includes a rear linkage, identical as the front linkage 1500a but linking the first rear side 1110b with the second rear side 1310b. Since the rear linkage is the same as the linkage 1500a, the disclosure and description of the rear linkage will not be repeated.

The first front side 1110a, the second front side 1310a, the first rear side 1110b, and the second rear side 1310b, may be each ended by an end cap 1600.

Each end cap 1600 can be used as an anchoring structure for the linkage 1500 as well as a foot to facilitate the loading of the load when the apparatus 1000 is in the open position.

Alternatively, the end cap 1600 may include a flat surface 1610 and a protrusion 1620. The first pivot 1532 and the third pivot 1536, or the second pivot 1534 and the fourth pivot 1538 may be affixed to the flat surface 1610 of the end cap 1600.

The protrusion 1620 may cover the linkage 1500 and provide a protection for the linkage 1500 against unintentional contacts such as stepping.

The protrusion 1620 may have an inclined surface providing a gradual connection between the lower support structure 3000 and the first contact surface 1110 and/or the second contact surface 1310.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A platform apparatus for a vehicle, comprising:
    a first structure including a first surface and a first interlocking joint;
    a second structure including a second surface and a second interlocking joint to receive the first interlocking joint; and
    a linkage that connects the first structure and the second structure and articulates the apparatus from a closed position to an open position, wherein
    the linkage includes a first arm that is pivotably connected to each of an end of the first structure and an end of the second structure,
    the linkage including a second arm that is pivotably connected to each of the end of the first structure and the end of the second structure, and
    in the closed position the first surface and the second surface are vertically stacked and in the open position the first structure and the second structure are interlocked through the first interlocking joint and the second interlocking joint and the first surface and the second surface are horizontally adjacent.

2. The platform apparatus of claim 1, wherein
the first structure includes a first pair of end caps,
the second structure includes a second pair of end caps, and
the linkage is affixed to the first pair of end caps and to the second pair of end caps.

3. The platform apparatus of claim 2, wherein each end cap of the first pair of end caps and the second pair of end caps includes a protrusion to protect the linkage.

4. The platform apparatus of claim 1, wherein the first and second surfaces include a plurality of slip resistant elements to increase friction between the first and second surfaces and a load.

5. The platform apparatus of claim 1, wherein the first structure includes at least one pair of handles to manipulate the platform apparatus.

6. The platform apparatus of claim 5, wherein the at least one pair of handles does not substantially protrude from the first surface when the at least one pair of handles is not in use.

7. The platform apparatus of claim 1, wherein the first structure and the second structure each include a plurality of holes to receive at least one strap to attach the platform apparatus to an upper support.

8. The platform apparatus of claim 7, wherein at least one hole of the plurality of holes is configured to mount the platform apparatus on a side of the vehicle.

9. The platform apparatus of claim 1, wherein the first interlocking joint and the second interlocking joint are on respective opposite sides of the platform apparatus when in the closed position.

10. The platform apparatus of claim 1, wherein the first structure includes a first rib at a concave portion of the first interlocking joint and the second structure includes a second rib at a concave portion of the second interlocking joint.

11. The platform apparatus of claim 1, wherein
in the closed position the second arm is above first arm, and
in the open position the first arm is above the second arm.

12. The platform apparatus of claim 1, wherein
a first end of the first arm includes a first pivot connected to the first structure and a second end of the first arm includes a second pivot connected to the second structure, and
a first end of the second arm includes a third pivot connected to the first structure and a second end of the second arm includes a fourth pivot connected to the second structure.

13. A platform apparatus for a vehicle, comprising:
a first structure including a first surface and a first interlocking joint;
a second structure including a second surface and a second interlocking joint to receive the first interlocking joint; and
a linkage that connects the first structure and the second structure and articulates the apparatus from a closed position to an open position,
wherein in the closed position the first surface and the second surface are vertically stacked and in the open position the first structure and the second structure are interlocked through the first interlocking joint and the second interlocking joint and the first surface and the second surface are horizontally adjacent, wherein
the first structure includes a first pair of end caps,
the second structure includes a second pair of end caps,
the linkage is affixed to the first pair of end caps and to the second pair of end caps, and
the linkage includes a pair of arms that connects one end cap of the first pair of end caps and one end cap of the second pair of end caps to rotate the first structure and the second structure around each other from the closed position to the open position.

* * * * *